United States Patent
Sato et al.

(10) Patent No.: US 6,871,890 B2
(45) Date of Patent: Mar. 29, 2005

(54) BUMPER MOUNTING STRUCTURE FOR VEHICLE

(75) Inventors: Manabu Sato, Yokohama (JP); Toshiyuki Asai, Zushi (JP); Haruaki Nakatsukasa, Ebina (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 0 days.

(21) Appl. No.: 10/411,360

(22) Filed: Apr. 11, 2003

(65) Prior Publication Data

US 2003/0218343 A1 Nov. 27, 2003

(30) Foreign Application Priority Data

Apr. 12, 2002 (JP) ..................................... P2002-110644

(51) Int. Cl.⁷ .............................................. B60R 19/34
(52) U.S. Cl. ...................................... 293/155; 293/122
(58) Field of Search ............................... 293/121–122, 293/154–155

(56) References Cited

U.S. PATENT DOCUMENTS

| | | | | |
|---|---|---|---|---|
| 4,488,745 | A | * 12/1984 | Stokes | 293/155 |
| 6,174,009 | B1 | * 1/2001 | McKeon | 293/133 |
| 6,354,641 | B1 | * 3/2002 | Schroeder et al. | 293/155 |
| 6,520,552 | B2 | * 2/2003 | Schroter et al. | 293/132 |

FOREIGN PATENT DOCUMENTS

| | | |
|---|---|---|
| JP | 4-67153 | 6/1992 |
| JP | 8-218807 | 8/1996 |
| JP | 10-278706 | 10/1998 |
| JP | 11-348691 | 12/1999 |
| JP | 2000-82551 | 2/2000 |
| JP | P2000-127873 A | 5/2000 |
| JP | 2000-238591 | 9/2000 |
| JP | 2001-71934 | 3/2001 |
| JP | 2001-208174 | 7/2001 |
| JP | 2001-301649 | 10/2001 |

* cited by examiner

Primary Examiner—Dennis H. Pedder
(74) Attorney, Agent, or Firm—McDermott Will & Emery LLP

(57) ABSTRACT

The bumper mounting structure includes a front side member 1 and a bumper reinforcing member 2. In assembly, the tip end of the front side member 1 is connected with the bumper reinforcing member 2. The tip end of the member 1 is opened and provided with a slant part 10, forming a weakened part in the member 1. When an impact load causes the bumper reinforcing member 2 to be deformed, the deformation of the front side member 1 is induced at its opened end because of its weakened structure. Consequently, it is possible to carry out the effective absorption of impact energy without elevating a reaction force abruptly.

9 Claims, 6 Drawing Sheets

BUMPER MOUNTING STRUCTURE FOR VEHICLE

BACKGROUND OF THE INVENTION

1. Field of the Invention

The present invention relates to a bumper mounting structure by which a bumper reinforcing member is connected with a bumper mounting member on the side of a vehicle body.

2. Description of Related Art

Japanese Patent Application Laid-open No. 2000-127873 discloses a bumper mounting structure for a vehicle. In the bumper mounting structure, the bumper reinforcing member is formed by a front side member having a closed section. The tip end of the front side member is connected with a bumper reinforcing member through a bumper arm. The bumper arm is adapted so as to close the tip end of the front side member.

The bumper arm is provided, on its inside portion in the width direction of the vehicle body, with a slant part which recedes back of the vehicle. Owing to the provision of the slant part, there is defined a gap between the bumper arm and the bumper reinforcing member. Due to the gap, when the bumper reinforcing member is bent by a vehicle collision at low speed, it is possible to prevent the front side member from being damaged.

SUMMARY OF THE INVENTION

In the above-mentioned bumper mounting structure, however, the front side member exhibits high rigidity at the tip end since it is closed up by the bumper arm.

As a result of subjecting of relatively-large collision load, therefore, if the bumper reinforcing member is deformed so as to abut on the slant part while collapsing the gap, the reaction force of the bumper arm and the front side member is so increased as to produce the possibility of ineffective absorption of impact by the deformation of the front side member.

In such a situation, it is an object of the present invention to provide a bumper mounting structure which is capable of effective absorption of impact energy as a result that the deformation of a bumper mounting member is induced at its tip end to restrain a sharp elevation of the above reaction force when the vehicle has an impact load from front. Noted that the bumper mounting member is joined to the bumper reinforcing member.

According to the present invention, the above-mentioned object is accomplished by a bumper mounting structure for a vehicle body of a vehicle, comprising a bumper reinforcing member arranged to extend in a width direction of the vehicle body, the bumper reinforcing member forming a bone structure of a bumper and a bumper mounting member arranged on each side of the vehicle in the width direction of the vehicle body to extend in a fore-and-aft direction of the vehicle body, the bumper mounting member having a closed cross section, wherein the bumper mounting member is formed so as to open at a front end thereof in the fore-and-aft direction of the vehicle body, the front end of the bumper mounting member is partially cut away on an inside thereof in the width direction of the vehicle body thereby to form a slant part, and the front end except the slant part of the bumper mounting member is connected with the bumper reinforcing member.

DESCRIPTION OF THE PREFERRED EMBODIMENT

Referring to accompanying drawings, various embodiments of the present invention will be described below.

Figure 1:
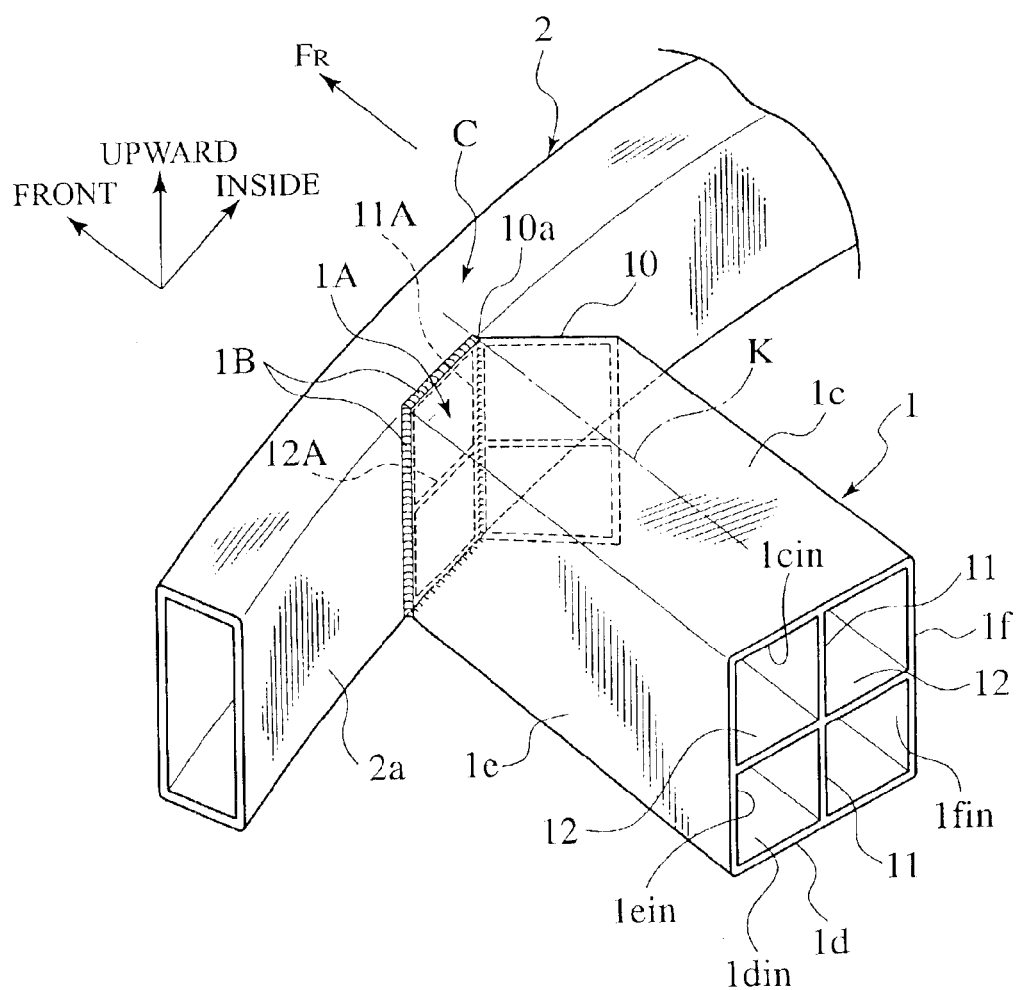
FIG. 1 is a perspective view showing a connecting part between a front side member and a bumper reinforcing member in accordance with a first embodiment of the present invention.
Figure 3A:
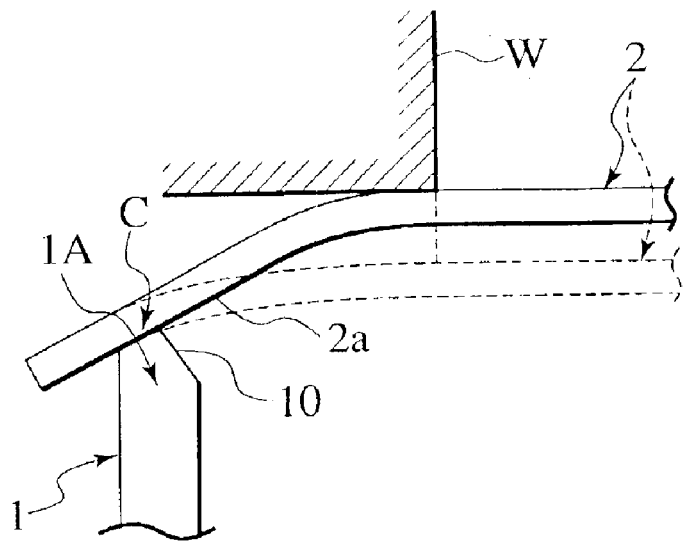
FIGS. 3A, 3B and 3C are sequential plan views showing the deformation of the front side member and the bumper reinforcing member when inputting a collision load.
Figure 3B:
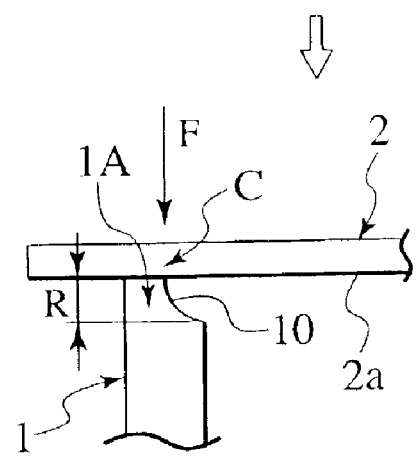
Figure 3C:
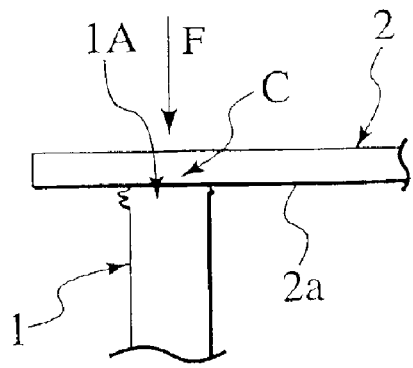
Figure 4:
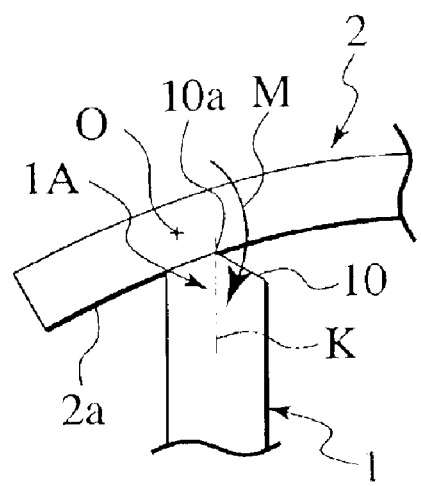
FIG. 4 is a plan view showing a rotating center of the connecting part when the bumper reinforcing member is deformed.
Figure 5:
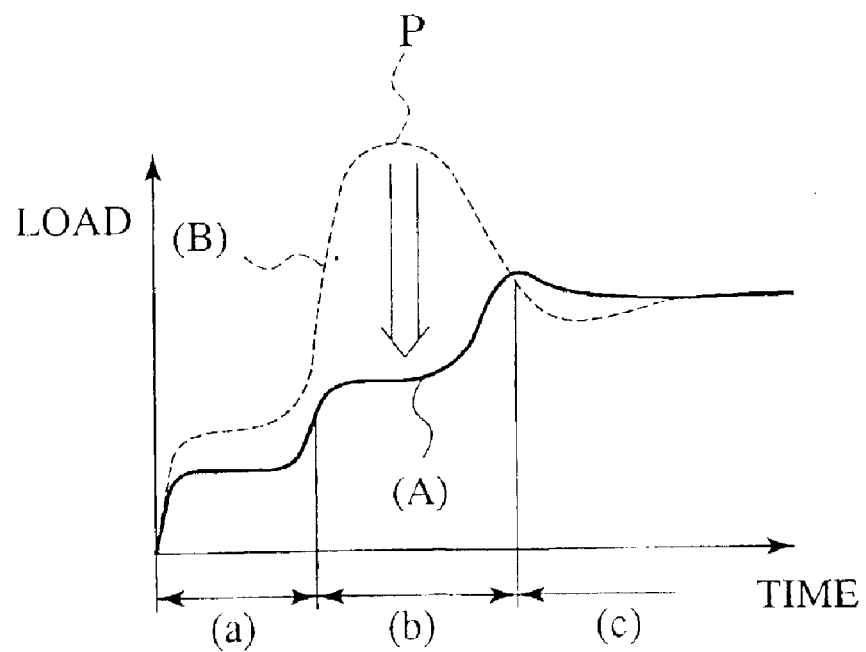
FIG. 5 is a characteristic diagram showing a load inputted to the bumper mounting structure of the first embodiment and a load inputted to the conventional structure.

FIGS. 1 to 5 show a bumper mounting structure in accordance with the first embodiment of the present invention. In the figures, FIG. 1 is a perspective view showing a connecting part between a front side member (as the bumper mounting member of the invention) and a bumper reinforcing member of the first embodiment, FIG. 2 a plan view showing the connecting part of the front side member with the bumper reinforcing member of the first embodiment, FIGS. 3A, 3B and 3C sequential plan views showing the deformation of the front side member and the bumper reinforcing member when inputting a collision load, FIG. 4 a plan view showing a rotating center of the connecting part when the bumper reinforcing member is deformed, and FIG. 5 is a characteristic diagram showing a load inputted to the bumper mounting structure.

In FIG. 1, the bumper mounting structure of the first embodiment includes a connecting part C where a bumper reinforcing member 2 is joined to the tip end of a front side member 1 as the bumper mounting member. Although a vehicle is provided with two connecting parts C, FIG. 1 illustrates the connecting part C on the left-hand side of a vehicle body.

On both sides (in the width direction) of the front part of the vehicle body, the front side members 1 are arranged to extend in the fore-and-aft direction of the vehicle body, forming one of main framework members in the front part of the vehicle body. The front side members 1 are adapted so as to support a not-shown power unit and front suspension units directly or indirectly.

Figure 2:
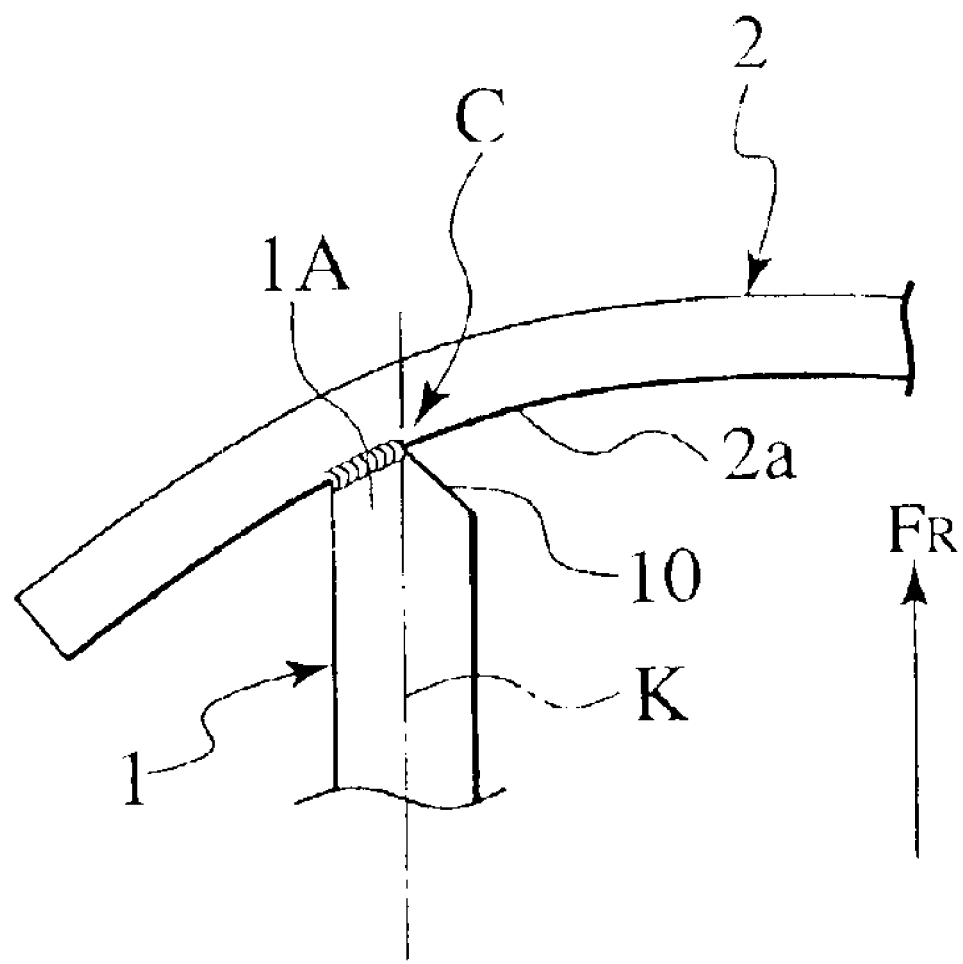
FIG. 2 is a plan view showing the connecting part between the front side member and the bumper reinforcing member in accordance with the first embodiment of the present invention.

The bumper reinforcing member 2 forms the skeleton of a front bumper and is generally shaped so as to draw an arc projecting forward in plan view, as shown in FIG. 2. The bumper reinforcing member 2 has both ends (in the width direction of the vehicle body) joined to the front side members 1.

The front side members 1 each includes upper, lower, left and right sidewalls 1c, 1d, 1e and 1f forming a rectangular closed section. On condition of opening at the tip end 1A, the front side member 1 has a slant part 10 formed to extend from the substantial central part K of the member 1 backward and inward in the width direction of the vehicle body. Except the slant part 10, the tip end 1A of the front side member 1 is welded to a rear face (connecting face) 2a of the bumper reinforcing member 2, providing a connecting part 1B.

The connecting part 1B of the front side member 1 is formed by respective front ends (portions) of the upper and lower sidewalls 1c, 1d, the portions extending outside of the central part K in the width direction, and the front end of the left sidewall 1e.

The tip end 1A of the front side member 1 is slanted so that its end face directs somewhat outward in the width direction of the vehicle body. Owing to the formation of the tip end 1A, each front side member 1 can be joined to the bumper reinforcing member 2 while making a substantial right angle with the width direction of the vehicle body, because the member 2 is curve-shaped to draw a substantial arc in plan view.

By extruding light alloy as extrusion material, such as aluminum alloy, the front side members 1 can be provided with closed sections.

In the closed section, each front side member 1 has a vertical rib 11 formed to extend from a leader 10a of the slant part 10 along the afore-and-aft direction of the vehicle body. The vertical rib 11 has its upper end connected with a face $1c_{in}$ of the upper sidewall 1c and the lower end connected with a face $1d_{in}$ of the lower sidewall 1d. Further, the vertical rib 11 has its tip end 11A welded to the bumper reinforcing member 2 as similar to the tip end of the front side member 1.

The front side member 1 further includes a horizontal rib 12 formed to extend from the tip end 1A along the afore-and-aft direction of the vehicle body, as well. The horizontal rib 12 has its outer end connected with a face $1e_{in}$ of the sidewall 1e and the inner end connected with a face $1f_{in}$ of the sidewall 1f.

Thus, owing to the provision of the vertical rib 11 and the horizontal rib 12, the front side member 1 has a cross section just like a paddy, in other words, window-shaped section, as shown in FIG. 1. The vertical rib 11 and the horizontal rib 12 are formed simultaneously with the extrusion of the front side member 1 of aluminum alloy. With the formation of the slant 10, the horizontal rib 12 is cut away at its tip end 12A partially, as well.

At a front collision of the vehicle, the bumper mounting structure of the first embodiment transmits a collision load F to the tip end 1A of the front side member 1 while being accompanied with the deformation of the bumper reinforcing member 2, as shown in FIGS. 3A, 3B and 3C.

That is, when the driver's vehicle has a front collision with an obstacle W, the bumper reinforcing member 2 is deformed, at its portion inside the front side member 1, in a direction to flatten the member 2, as shown with broken lines of FIG. 3A.

At this time, as shown in FIG. 4, the bumper reinforcing member 2 is deformed so as to pivot round a rotating center O established in the vicinity of the tip end 1A of the front side member 1, thereby producing a torque M.

At the initial stage of collision until the slant part 10 of the tip end 1A collapses, since the connecting part between the front side member 1 and the bumper reinforcing member 2 displays so-called "pin" action, a momentum to be transmitted to the front side member 1 (torque M) can be decreased to reduce an impact inputted to the vehicle body.

In this way, for a relatively-small impact load F, which is not as large as collapsing the slant part 10, the impact energy of the load F can be absorbed by the deformation of the only bumper reinforcing member 2 and therefore, it is possible to restrain the damage on the front side member 1 to the utmost.

Next, as shown in FIG. 3B, when the deformation of the bumper reinforcing member 2 progresses due to the collision load F, the tip end 1A of the front side member 1 is deformed. Since the tip end 1A is formed by a weakened part R resulting from the provision of the slant part 10, the deformation of the weakened part R allows the torque to be absorbed without being accompanied with sharp rise of reaction force. Thus, it is possible to absorb impact energy effectively.

When the input of the load F causes the bumper reinforcing member 2 and the tip end 1A of the front side member 1 to be deformed, the crescent-shaped bumper reinforcing member 2 is deformed in a direction to make a right angle with the front side member 1, with the gradual deformation of the slant part 10. Consequently, the load F can be transmitted to the front side member 1 in the axial direction. Due to this axial collapse of the front side member 1, it is possible to enhance the absorbing efficiency of impact energy.

Again, in process of the deformation of the tip end 1A of the front side member 1 from a state of FIG. 3B to a state of FIG. 3C due to the collision load F, the slant part 10 begins to collapse from its tip end having the smallest cross-sectional area gradually. Thus, as shown in FIG. 5, according to the embodiment, it is possible to reduce a peak load P in the early stage of collision in comparison with the conventional structure.

In FIG. 5, a solid line (A) designates a load-time curve of the bumper mounting structure of this embodiment, while a broken line (B) designates a load-time curve of the conventional bumper mounting structure. Further, a horizontal axis designates a time change where sections (a), (b) and (c) correspond to the conditions of FIGS. 3A, 3B and 3C, respectively. While, a vertical axis denotes a load to be inputted to the vehicle body.

In the conventional characteristics shown with the line (B), since the bumper reinforcing member deformed by the collision load comes into full contact with the bumper mounting member, the load is abruptly elevated to produce a peak load P. According to the embodiment, since the load is increased in stages corresponding to the deformations shown in FIGS. 3A, 3B and 3C, it is possible to absorb an impact inputted to the vehicle body effectively without producing a remarkable load peak in the early stage of collision.

Thus, according to the embodiment, it is possible to rationalize the reinforcement of a vehicle cabin forming a passengers' space of residence, whereby the weight saving of the vehicle body can be accomplished with a reduction in the number of reinforcing members. Particularly, since the front side member 1 is formed by an extrusion of aluminum alloy etc., it is possible to progress the weight saving of the vehicle body furthermore, whereby both fuel consumption and traveling performance can be improved.

In addition to superior effects of this embodiment, since the slant part 10 of this embodiment can be provided by only cutting the opening tip end 1A of the front side member 1 connected to the bumper reinforcing member 2 obliquely, it is possible to facilitate the processing of the front side member 1 remarkably.

Further, since the vertical rib 11 in the closed section of the front side member 1 is positioned at the leader 10a of the slant part 10, it is possible to enhance the connecting rigidity between the front side member 1 and the bumper reinforcing member 2 without losing the brittleness of the slant part 10.

Additionally, since the provision of the horizontal rib 12 in the closed section of the member 1 allows the rigidity to be improved, it is possible to form the thin-walled member 1, progressing the weight saving furthermore.

As mentioned above, the front side member 1 of the first embodiment is formed with the paddy (or window)-shaped cross section consisting of the vertical rib 11 and the horizontal rib 12. In the modification, the front side member 1 may include either or neither of the vertical rib 11 and the horizontal rib 12. Then, in all cases, the front side member 1 can be provided by extruding light metal alloy with ease. Regarding the formation of the slant part 10, it can be obtained by only cutting the tip end 1A, as similar to the first embodiment, facilitating the processing.

Figure 6:
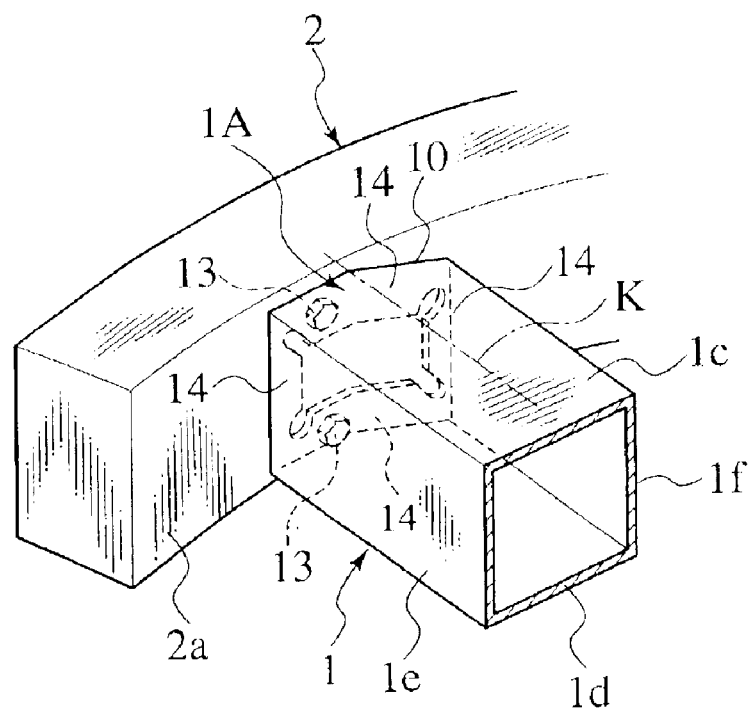
FIG. 6 is a perspective view showing the connecting part between the front side member and the bumper reinforcing member in accordance with the modification of the first embodiment.
Figure 7:
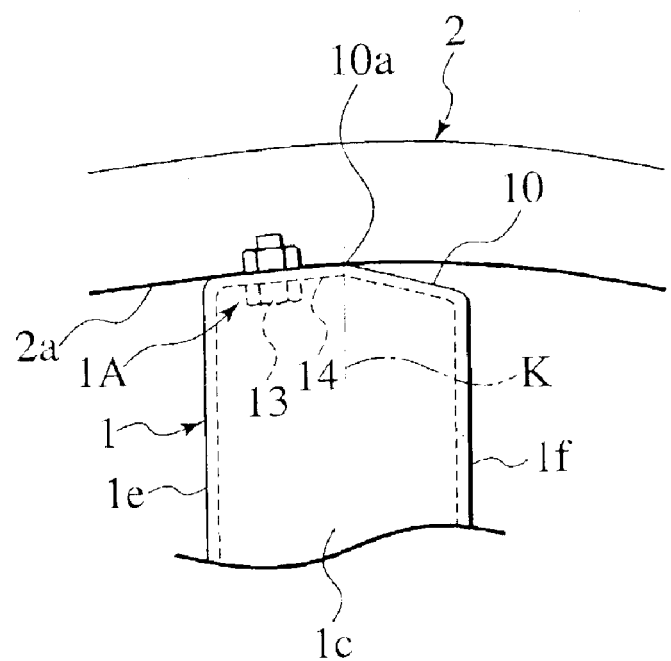
FIG. 7 is a plan view showing the connecting part of the front side member with the bumper reinforcing member in accordance with the modification of the first embodiment.

Although the front side member 1 is formed by extruding light metal alloy, the invention is not limited to this embodiment only. For example, as shown in FIGS. 6 and 7, the front side member 1 may be formed by press molding. In connection, the so-formed front side member 1 may be connected with the bumper reinforcing member 2 by means of welding or bolts 13.

Noted that the so-pressed front side member 1 includes the sidewalls 1c, 1d, 1e, 1f whose tips are folded inward to provide respective folding parts 14 to be connected to the member 1 by welding or the bolts 13. Of course, even when the front side member 1 is formed by press molding, the tip end 1A of the member 1 is provided with the slant part 10.

Figure 8:
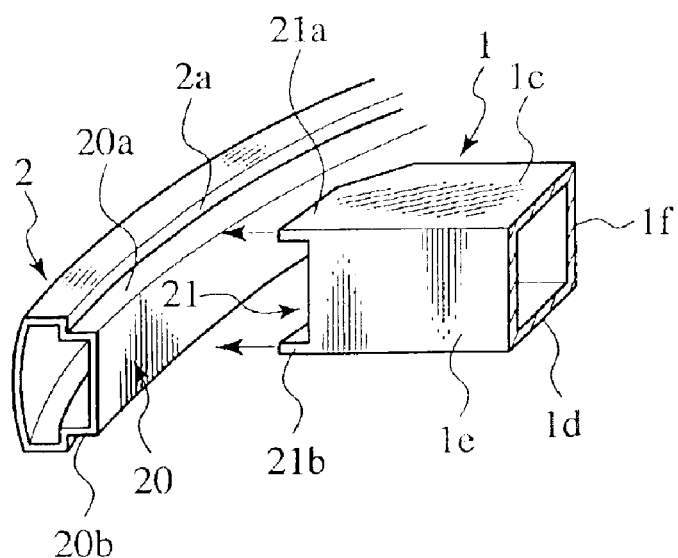
FIG. 8 is an exploded perspective view showing the connecting part between the front side member and the bumper reinforcing member in accordance with a second embodiment of the present invention.
Figure 9:
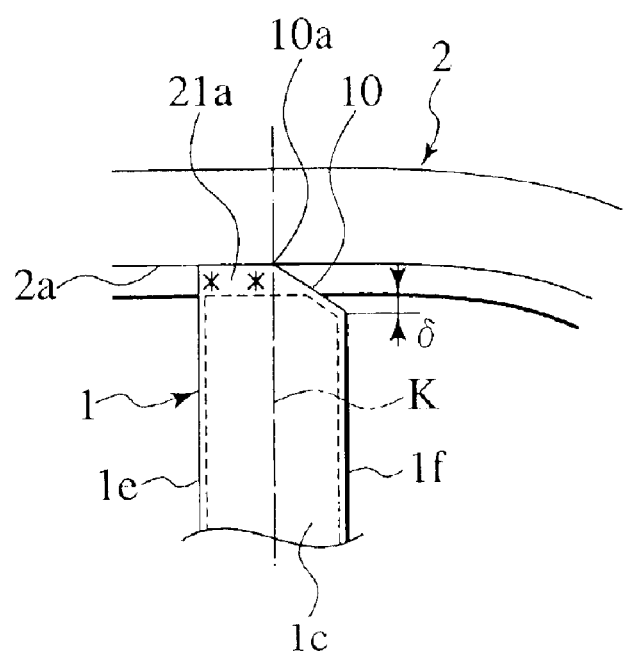
FIG. 9 is a plan view showing the connecting part between the front side member and the bumper reinforcing member in accordance with the second embodiment of the present invention.

FIGS. 8 and 9 show the second embodiment of the present invention. In this embodiment, elements identical to those of the previous embodiment are indicated with the same reference numerals respectively and therefore, their overlapping descriptions are eliminated.

FIG. 8 is an exploded perspective view showing the connecting part between the front side member 1 and the bumper reinforcing member 2. FIG. 9 is a plan view of the connecting part of FIG. 8.

According to the second embodiment, the bumper reinforcing member 2 is provided, on its joint face 2a, with a protrusion part 20 which includes steps 20a, 20b and extends in the width direction of the vehicle body. While, the front side member 1 is provided, on its connecting side, with a recessed part 21 for engagement with the protrusion part 20 of the member 2.

The recessed part 21 includes an upper and lower extensions 21a, 21b formed to extend from the sidewalls 1c, 1d of the front side member 1. In connection, as shown in FIG. 9, the front side member 1 is joined to the bumper reinforcing member 2 by spot-welding the extensions 21a, 21b of the recessed part 21 to the steps 20a, 20b, respectively.

Of course, the upper and lower extensions 21a, 21b are respectively provided with the slant part(s) 10 which extend from the center part K inward in the width direction of the vehicle body. The slant parts 10 are not welded to the steps 20a, 20b, respectively.

Additionally, there is defined a predetermined gap δ between the leader of the sidewall 1f of the front side member 1 and the protrusion part 20.

Therefore, when the bumper reinforcing member 2 is deformed due to the input of collision load, the bumper mounting structure of the second embodiment of the present invention can fulfill the similar function to those of the first embodiment owing to the establishment of the slant parts 10 formed in the extensions 21a, 21b and the above gap δ defined between the leader of the sidewall 1f of the front side member 1 and the protrusion part 20. Further, according to the embodiment, with the engagement of the protrusion part 20 with the recessed part 21, it becomes possible to facilitate the positioning of the front side member 1 in relation to the bumper reinforcing member 2 in assembling the bumper mounting structure.

In the above descriptions, the present invention is embodied by way of example of the bumper mounting structure on the left side of the vehicle body. Of course, the present invention is applicable to the same structure of the right side of the vehicle body.

Finally, it will be understood by those skilled in the art that the foregoing descriptions are nothing but some embodiments of the disclosed bumper mounting structure for a vehicle. Besides these embodiments, various changes and modifications may be made to the present invention without departing from the spirit and scope of the invention. For example, although the above-mentioned embodiments each relates to the bumper mounting structure using the front side member 1 as the bumper mounting member, the member 1 may be replaced with an exclusive bumper mounting member to be joined with the bumper reinforcing member 2.

Japanese Patent Application No. 2002-110644 (filed on Apr. 12, 2002) is incorporated herein by reference in its entirety.

The scope of the invention is defined with reference to the following claims.

What is claimed is:

1. A bumper mounting structure for a vehicle, comprising:
a bumper reinforcing member arranged to extend in a width direction of a vehicle body, the bumper reinforcing member forming a bone structure of a bumper; and
a bumper mounting member arranged on each side of the vehicle in the width direction of the vehicle body to extend in a fore-and-aft direction of the vehicle body, the bumper mounting member having a closed cross section, wherein
the bumper mounting member is formed so as to open at a front end thereof in the fore-and-aft direction of the vehicle body,
the front end of the bumper mounting member is partially cut away on an inside thereof in the width direction of the vehicle body thereby to form a slant part,
the front end except the slant part of the bumper mounting member is connected with the bumper reinforcing member,
the bumper mounting member is provided, in the closed cross section, with a vertical rib that begins at a leader of the slant part to extend in the fore-and-aft direction of the vehicle body, the vertical rib connecting an upper face of the bumper mounting member with a lower face thereof, and
the tip end of the vertical rib is also connected with the bumper reinforcing member.

2. The bumper mounting structure of claim 1, wherein the bumper mounting member is provided, in the closed cross section, with a horizontal rib that connects a left lateral face of the bumper mounting member with a right lateral face thereof and extends in the fore-and-aft direction of the vehicle body.

3. The bumper mounting structure of claim 1, wherein the bumper reinforcing member is provided, on its connecting face with the bumper mounting member, with a protrusion part which includes upper and lower steps extending in the width direction of the vehicle body, and the bumper mounting member is provided, on its connecting face with the bumper reinforcing member, with a recessed part for engagement with the protrusion part of the bumper reinforcing member.

4. The bumper mounting structure of claim 1, wherein the bumper mounting member is formed by an extrusion made of light metal alloy.

5. The bumper mounting structure of claim 1, wherein the front end except the slant part of the bumper mounting member is connected with the bumper reinforcing member through welding.

6. The bumper mounting structure of claim 1, wherein the front end except the slant part of the bumper mounting member is connected with the bumper reinforcing member through bolts.

7. The bumper mounting structure of claim 1, wherein the bumper mounting member comprises a front side member forming the vehicle body.

8. The bumper mounting structure of claim 1, wherein the bumper mounting member comprises an exclusive member different from a front side member forming the vehicle body.

9. A bumper mounting structure for a vehicle, comprising:

bumper reinforcing means arranged to extend in a width direction of a vehicle body, the bumper reinforcing means forming a bone structure of a bumper; and bumper mounting means arranged on each side of the vehicle in the width direction of the vehicle body to extend in a fore-and-aft direction of the vehicle body, the bumper mounting means having a closed cross section, wherein the bumper mounting means is formed so as to open at a front end thereof in the fore-and-aft direction of the vehicle body, the front end of the bumper mounting means is partially cut away on an inside thereof in the width direction of the vehicle body thereby to form a slant part, and the front end except the slant part of the bumper mounting member is connected with the bumper reinforcing means, the bumper mounting means is provided, in the closed cross section, with a vertical rib that begins at a leader of the slant part to extend in the fore-and-aft direction of the vehicle body, the vertical rib connecting an upper face of the bumper mounting means with a lower face thereof, and the tip end of the vertical rib is also connected with the bumper reinforcing means.

* * * * *